J. J. ADGATE.
NUT-LOCK.
No. 174,175. Patented Feb. 29, 1876.
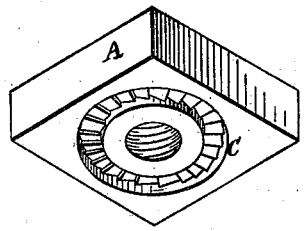
Fig. 1.
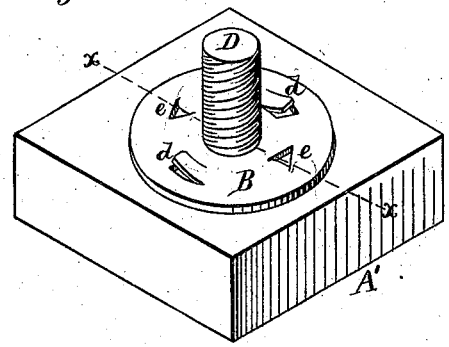
Fig. 2.
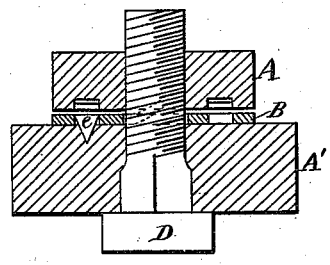
Fig. 3.
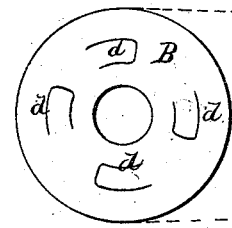
WITNESSES
Henry N. Miller
C. L. Ewert
INVENTOR
J. J. Adgate
Alexander Mason
By Attorneys
N.PETERS, PHOTO-LITH. WASHINGTON, D.C.

UNITED STATES PATENT OFFICE

JOSEPH J. ADGATE, OF NEW YORK, N. Y.

IMPROVEMENT IN NUT-LOCKS.

Specification forming part of Letters Patent No. 174,175, dated February 29, 1876; application filed February 17, 1876.

*To all whom it may concern:*

Be it known that I, J. J. ADGATE, of New York city, in the county of New York and in the State of New York, have invented certain new and useful Improvements in Nut-Locks; and do hereby declare that the following is a full, clear, and exact description thereof, reference being had to the accompanying drawings, and to the letters of reference marked thereon, making a part of this specification.

The nature of my invention consists in the construction of a nut and of a washer, and adapting them together for the purpose of holding the nut upon a bolt, as will be hereinafter more fully set forth.

In the accompanying drawings, making part of this specification, Figure 1 is a perspective of the nut, as also the washer and bolt and a section of a block or bar, through which the bolt passes. Fig. 2 is a section, and Fig. 3 is a view, of the washer, showing that it may be elongated in some cases.

In the figures, A represents the nut, which is formed with an annular groove in its inner face, as seen at C. In the bottom of this groove, which is made only about the eighth of an inch deep, is a series of teeth or corrugations, which, though somewhat V-shaped, are more abrupt upon one side than the other. B represents the washer, which may be made annular or square. Four or more tongues are formed upon this washer by punching a portion of the metal. Two of the tongues are punched outward and two inward, as represented. The object of punching them inward is that they may enter the wood through which the bolt passes, and prevent it from turning.

If the washer is used with iron, then openings to receive the tongues are made in the iron. If used on railroad-iron fish-plates, the washer may have its lower side extended until it touches the bottom portion of the rail.

The object of the outer tongues is to catch into the teeth in the groove of the nut, so that said nut may be prevented from turning.

The tongues, on account of the peculiar construction of the teeth, will pass over them freely when the nut is being screwed on; but they catch against the opposite sides when the nut is reversed, and prevent its being moved, except by the use of a wrench or great force.

When force is applied to reverse the nut the tongues *d d* bend inward, and allow the nut to be removed.

I am aware that a nut has been constructed with a recess in its bearing-surface having ratchet-teeth, and used in connection with a metal washer having a spring-tongue to engage with said ratchet-teeth; but said recess is extended to the bolt-hole, and leaves a bearing only outside of said recess. I form an annular groove in the bearing-face of the nut, and provide a bearing on both sides of said groove.

Having thus fully described my invention, what I claim as new, and desire to secure by Letters Patent, is—

The nut A, having an annular groove, C, in the bottom of which is a series of ratchet-teeth, said groove arranged to leave a bearing upon both sides thereof, in combination with the washer B, having outwardly-projecting spring-tongues *d d* and suitable devices to prevent its turning, substantially as and for the purposes herein set forth.

In testimony that I claim the foregoing I have hereunto set my hand this 16th day of February, 1876.

JOSEPH J. ADGATE.

Witnesses:
H. A. HALL,
J. M. MASON.